United States Patent [19]
West et al.

[11] Patent Number: 5,714,699
[45] Date of Patent: Feb. 3, 1998

[54] APPARATUS AND METHOD FOR INSPECTING CLOSURES

[75] Inventors: Keith West, Grove, United Kingdom; Francisco Ascascibar, Sevilla, Spain

[73] Assignee: Carnaudmetalbox (Holdings) USA, Inc., Wilmington, Del.

[21] Appl. No.: 610,125

[22] Filed: Feb. 28, 1996

[30] Foreign Application Priority Data

Mar. 1, 1995 [GB] United Kingdom ............... 9504091

[51] Int. Cl.⁶ .................................................. G01M 19/00
[52] U.S. Cl. ............................................ 73/865.9; 73/865.8
[58] Field of Search ................................ 73/865.8, 865.9

[56] References Cited

U.S. PATENT DOCUMENTS

| | | | |
|---|---|---|---|
| 3,039,604 | 6/1962 | Bickel et al. | 73/865.9 X |
| 4,619,141 | 10/1986 | Yoshieda et al. | 73/865.9 |
| 4,852,415 | 8/1989 | Bogatzki et al. | 73/865.8 |
| 5,505,099 | 4/1996 | Tanaka | 73/865.9 |
| 5,511,648 | 4/1996 | Kaminski et al. | 73/865.9 X |
| 5,576,504 | 11/1996 | Evers | 73/865.9 |

*Primary Examiner*—Thomas P. Noland
*Attorney, Agent, or Firm*—Diller, Ramik & Wight, PC

[57] ABSTRACT

An automatic apparatus for inspecting, in particular, vacuum closures, the apparatus having an indexing turret which transports the closures to stations at which various parameters can be measured. The closures are removed from the production line for measurement and returned to the line after testing, with no damage to the closures.

4 Claims, 2 Drawing Sheets

APPARATUS AND METHOD FOR INSPECTING CLOSURES

BACKGROUND OF THE INVENTION

This invention relates to the inspecting of closures for packaging containers, particularly (but not exclusively) vacuum closures of metal for food and beverage product containers subsequent to their manufacture.

Hitherto, the production of vacuum closures for food and beverage product containers, in particular vacuum closures of the kind which are commonly known as "PT caps" and "TO (or lug) caps" has been monitored for quality by taking caps randomly from the manufacturing line at intervals of time and subjecting the caps to a series of generally manually performed tests prior to passing to a packing station. However, the time intervals between successive tests have often been substantial (eg two hours) so that whenever a cap which is tested is found to be unsatisfactory, a large number of caps, namely those manufactured since the previous test samples were taken, may have to be scrapped. In addition, the tests themselves may be tedious and repetitive, so leading to a significant possibility of human error in the test procedures performed.

SUMMARY OF THE INVENTION

According to the present invention, there is provided an apparatus for inspecting metal closures after their manufacture, comprising:

a turret rotatable about a vertical axis and having a plurality of closure holders spaced at regular intervals therearound for holding the closures;

horizontally spaced stations operatively associated with the turret;

testing means at some of the stations and arranged for performing a plurality of qualitative tests in predetermined order on closures held by the holders;

drive means arranged for rotating the turret intermittently so that a closure is presented and halted at the stations in sequence, one of the stations being an infeed station at which the closures are fed in turn to the closure holders of the turret, a second of the stations being means arranged to invert the closures, a third of the stations being means to return the closures to their original orientation and a fourth of the stations being an outfeed station at which the closures are removed from the turret after testing.

According to another aspect of the present invention, there is provided an apparatus for inspecting metal closures after their manufacture, comprising:

a rotatable turret having a plurality of closure holders spaced therearound for holding the closures;

stations operatively associated with the turret; and drive means arranged for rotating the turret intermittently so that a closure is presented and halted at the stations in sequence;

the stations including:

an infeed station at which the closures are fed in turn to the closure holders of the turret;

testing stations having testing means arranged for performing a plurality of quantitative and qualitative tests in predetermined order on closures;

one or more turn-over stations arranged to turn-over the closure and/or return the closure to its original orientation; and an outfeed station at which the closures are removed from the turret after testing.

Preferably at least some of the testing stations include a lifting means for lifting a closure to a raised position at which the associated testing means may be effective. Means may also be provided for rotating the closure while testing is taking place.

According to another aspect of the present invention, there is provided a method of inspecting a metal closure after its manufacture, comprising feeding closures in turn to closure holders of a turret which is intermittently rotated to present and halt the closures at a plurality of stations operatively associated with the turret.

An embodiment of the invention will now be described by way of example only with reference to the drawings, in which:

DESCRIPTION OF THE PREFERRED EMBODIMENTS

Figure 1:
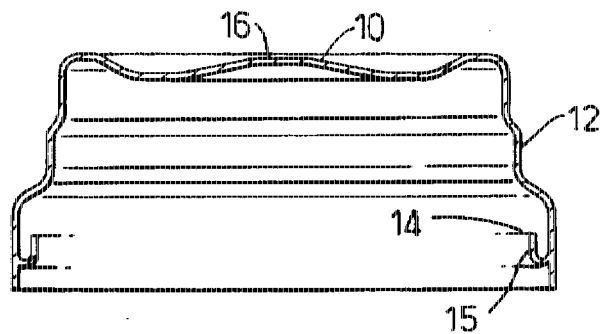
FIG. 1 is a side section of a press-on twist-off closure.
Figure 2:
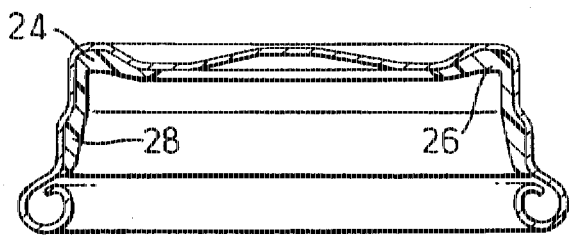
FIG. 2 is a side section of a press-on twist-off closure with plastisol lining compound.

FIGS. 1 and 2 show a typical vacuum closure for a jar of baby food. The closure is stamped from a sheet metal disc and has a generally plane closure panel 10 to overlie the mouth of the jar and a skirt 12 which depends from the closure panel peripherary.

The cut edge 14 of the metal is located in an inturned curl 15 forming the free edge of the skirt.

A tamper evident button 16 is generally formed centrally in the closure panel by a metal forming operation. The button has a plane central post 18 and inner annular portions 20, 22. The button has a raised stable position as shown and an unstable depressed position to which it is moved by a vacuum which is found in the container headspace when the closure is first fitted to the jar by the food packer.

In known manner, subsequent removal of the vacuum such as would be caused by removal of the closure allows the button to return to its raised position to provide visible tamper evidence for the closure.

The closure is of the kind commonly known as a "PT (Press-on Twist-off) cap" and accordingly has an interior lining 24 of a compound such as "plastisol"(trade mark) which covers a peripheral margin 26 of the closure panel and an adjacent part 28 of the skirt.

In use, the part of the compound located in the closure panel will serve to provide a hermetic seal for the jar, whereas that part which is located on the skirt will conform itself permanently to screw threads formed on the neck of the jar so as to provide a complementary screw thread formation for the closure.

Figure 3:
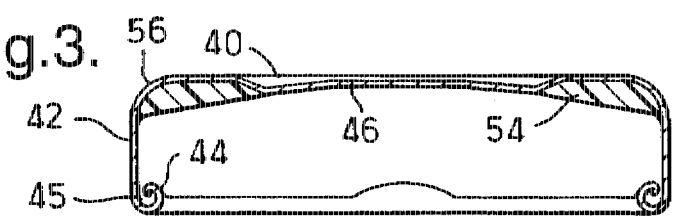
FIG. 3 is a side section of a twist-open or lug closure.
Figure 4:
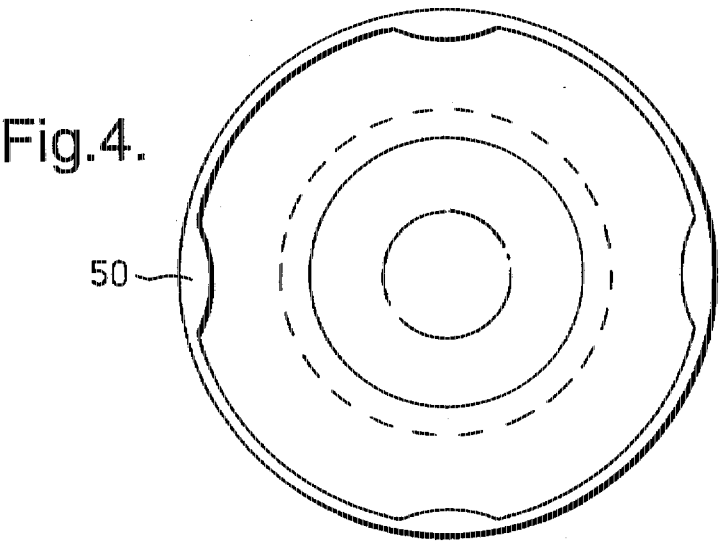
FIG. 4 is an underplan view of the closure of FIG. 3.

FIGS. 3 and 4 show an alternative form of closure which can be tested with the apparatus of the present invention. This type of closure is known as a "Twist Open" or "Lug" cap. This closure is also stamped from a sheet metal disc and has a generally plane closure panel 40 to overlie the mouth of a jar and a skirt 42 which depends substantially at right angles from the peripherary of the panel 40.

The cut edge 44 of the metal is located in an inturned curl 45 which forms the free edge of the skirt. In addition, the free edge includes three or more lugs 50 (here four are shown) equispaced about its peripherary for gripping threads on the container onto which it is placed.

In a similar manner to the PT cap, a tamper evident button 46 may be formed in the centre of the closure panel 40. A lining compound 54 covers only a peripheral margin 56 of the closure panel so as to provide a hermetic seal for the container.

Figure 5:
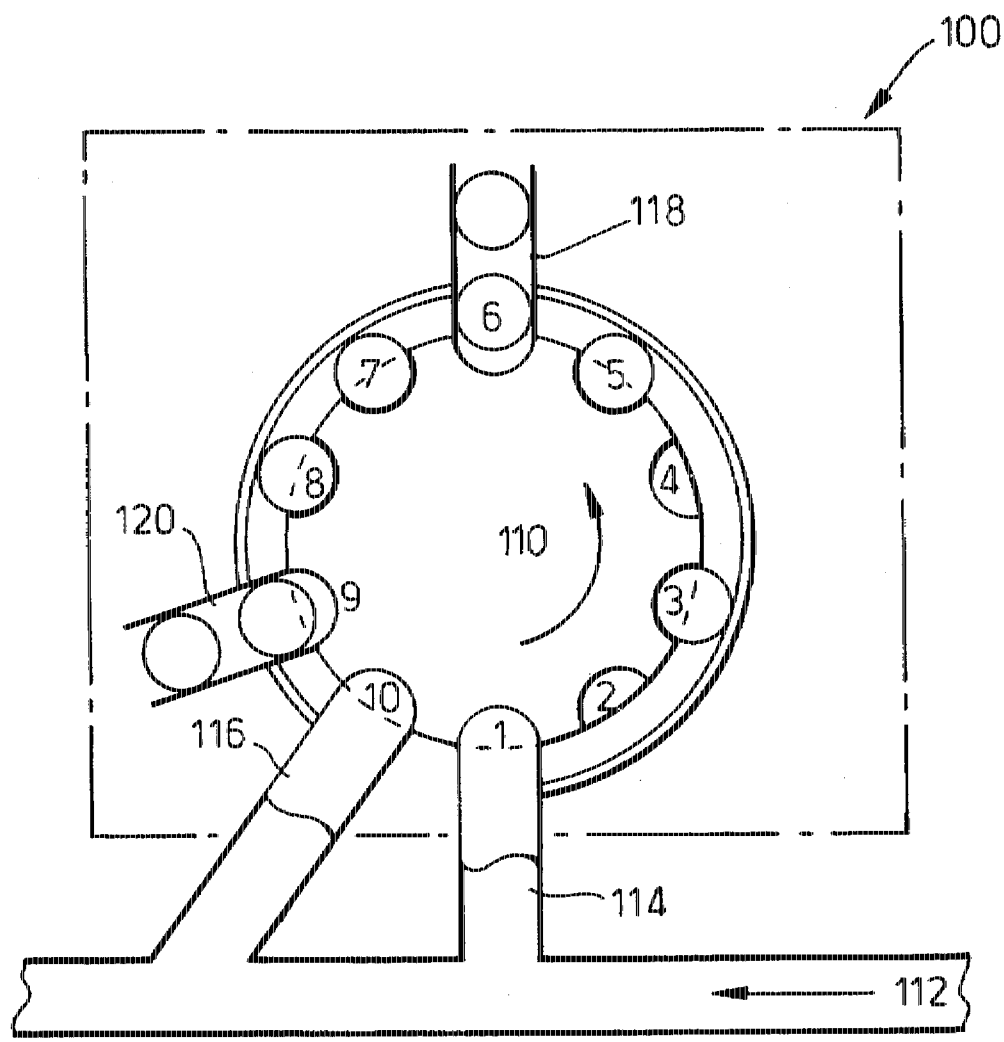
FIG. 5 is a schematic view of an automatic testing machine.

Referring now to FIG. 5 of the drawings, an apparatus is shown for testing a vacuum closure such as is shown in FIGS. 1 and 2 or FIGS. 3 and 4.

Generally about 450 to 1300 closures are manufactured each minute. Rather than test one closure, or cap, each minute, five caps are removed from the line every 5 minutes for evaluation. This gives a more meaningful statistical result. The automatic inspection machine comprises a ten headed index machine 100. The individual heads move during testing to each of ten stations which are numbered 1 to 10 in the figure.

The stations are mounted around an indexing turret 110 comprising a ten pocket starwheel adjacent to the conveyor 112 along which caps arrive following manufacture. Access to and from the inspection machine is provided by infeed air conveyor 114 and outfeed air conveyor 116 respectively or, alternatively, by belts.

In order to measure both internal and external characteristics of the caps, two turn over points 118, 120 are provided so as to invert the caps for testing. The turret indexes by rotation in an anti-clockwise direction as shown in the figure so as to move the caps in turn to the next station.

Every 5 minutes, 5 caps are automatically taken from the conveyor 112 onto five consecutive heads, the heads being rotated with the turret so that a free head is available for the next cap. Rotation of the turret also moves each cap to the next station and operates at the rate of one station every 30 to 90 seconds.

Stations 2 and 4 are idle stations which are required due to the space needed for individual machines for testing at stations 3 and 5. Further measurements are carried out at stations 7 and 8. The stations 3 and 5 are provided for making internal measurements with each cap in the orientation with which it is fed onto the machine.

All measurements are carried out by moving a mandrel into the closure to engage and lift the cap out of the head (star wheel pocket) for measurement. Spinning of the closure is also possible so as to make measurements at different points around the closure.

Station 3 measures the thickness of the lining compound within the cap and the internal curl diameter. For PT caps, the thickness of the compound on both the closure panel and on the skirt side wall is measured, whereas for lug caps, only the panel measurement is required as there is no compound within the skirt (see FIG. 3).

Station 5 is used to measure the dimensions of each lug by spinning the cap to each lug in turn and is an idle station for PT caps.

Following the internal dimensional measurements, the caps move to turn over point 118 which comprises a standard turn over unit known in the art. Once the cap has been turned over, it is moved by rotation of the turret to station 7 for testing of the tamper evident button.

Station 7 is a vacuum station at which the cap is engaged by a mandrel and a vacuum is applied to the inside of the cap so as to cause the tamper evident button to be depressed. A microphone is used so as to detect audibly the point at which the button is depressed and pressure at which this occurs is noted automatically. The vacuum is applied until a pressure transducer measures a predetermined fixed pressure at which the vacuum is switched off. The return pressure at which the button flips back to its original stable position is noted and the audible signal due to this return motion is also measured.

The final measurement station, station 8, conducts measurement of overall dimensions of the cap such as panel depth and height, crown and curl diameter and overall height. Following these measurements, the caps are turned back to their original orientation at turn over point 120 adjacent to station 9 and, at station 10, the cap is taken back onto the conveyor 112 via outfeed conveyor 116.

All the testing, transportation of caps, turn over etc is fully automatic and has no requirement for manual processing. The information received from the measuring heads is processed and stored in a central computer and displayed on the visual display unit (VDU), for example using control charts showing actual readings displayed between upper and lower critical limits, bar charts or other display which can be readily interpreted.

After testing, caps are returned to the production line or are removed if a fault has been detected. No damage to the caps arises from the testing. It can be seen that the machine is capable of testing either PT or lug caps and heads are dimensioned so as to accomodate standard sizes of vacuum caps ranging from 27 mm diameter to 82 mm diameter with an overall height of between 9 mm and 15 mm.

It will be appreciated that the invention has been described above by way of example only and that changes may be made without departing from the scope of the invention.

We claim:

1. An apparatus for inspecting metal closures after their manufacture, comprising:
   a turret rotatable about a vertical axis and having a plurality of closure holders spaced at regular intervals there-around for holding the closures;
   horizontally spaced stations operatively associated with the turret;
   testing means at some of the stations and arranged for performing a plurality of quantitative and qualitative tests in predetermined order on closures held by the holders;
   drive means arranged for rotating the turret intermittently so that a closure is presented and halted at the stations in sequence, one of the stations being a infeed station at which the closures are fed in turn to the closure holders of the turret, a second of the stations having means for inverting the closures, a third of the stations having means for returning the closures to their original orientation, and a fourth of the stations being an outfeed station at which the closures are removed from the turret after testing.

2. An apparatus for inspecting metal closures after their manufacture, comprising:
   a rotatable turret having a plurality of closure holders spaced therearound for holding the closures;
   stations operatively associated with the turret;
   and drive means arranged for rotating the turret intermittently so that a closure is presented and halted at the stations in sequence;
   the stations including;
   an infeed station at which the closures are fed in turn to the closure holders of the turret;
   testing stations having testing means arranged for performing a plurality of quantitative and qualitative tests in predetermined order on closures;

at least one turn-over station having means for turning over a closure;

at least one return station having means for returning a turned-over closure to its original orientation; and an outfeed station at which the closures are removed from the turret after testing.

3. A method of inspecting metal closures after their manufacture utilizing a turret rotatable about a vertical axis and having a plurality of closure holders spaced at regular intervals therearound for holding the closures with horizontally disposed and arcuately spaced stations operatively associated with the turret; the method including the steps of testing closures held by the holders at some of the stations;

rotating the turret intermittently so that a closure is presented and halted at the stations in sequence;

infeeding closures at an infeed station to the closure holders of the turret;

inverting the closures at a second station;

returning the closures to their original orientation at a third station; and discharging the closures from the turret at an outfeed station after testing.

4. A method of inspecting metal closures after their manufacture utilizing a rotatable turret having a plurality of closure holders spaced therearound for holding the closures with stations operatively associated with the turret, the method including steps of intermittently rotating the turret so that a closure is presented and halted at the stations in sequence;

feeding the closures to the closure holders of the turret at an infeed station;

performing a plurality of quantative and qualitative tests in predetermined order on the closures beyond the infeed station at subsequent testing stations;

turning over a closure at a turnover station;

returning a turned-over closure to its original orientation at a closure returning station downstream of the turn-over station; and removing closures after testing from the turret at an outfeed station.

* * * * *